(12) United States Patent
Suzuki et al.

(10) Patent No.: US 12,470,806 B2
(45) Date of Patent: Nov. 11, 2025

(54) ELECTRONIC APPARATUS, ITS CONTROL METHOD, AND STORAGE MEDIUM

(71) Applicant: CANON KABUSHIKI KAISHA, Tokyo (JP)

(72) Inventors: Yasuyuki Suzuki, Kanagawa (JP); Yosuke Mine, Tokyo (JP); Koichi Ito, Tokyo (JP); Takeshi Uchida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 18/515,551

(22) Filed: Nov. 21, 2023

(65) Prior Publication Data

US 2024/0187724 A1 Jun. 6, 2024

(30) Foreign Application Priority Data

Dec. 1, 2022 (JP) .................. 2022-192659

(51) Int. Cl.
*H04N 23/63* (2023.01)
(52) U.S. Cl.
CPC .................. *H04N 23/63* (2023.01)
(58) Field of Classification Search
CPC ...................................... H04N 23/63
USPC .................................... 348/333.01
See application file for complete search history.

(56) References Cited

U.S. PATENT DOCUMENTS

2021/0173284 A1 6/2021 Sugaya
2023/0013134 A1 1/2023 Yamamoto

FOREIGN PATENT DOCUMENTS

| JP | H11326747 A | 11/1999 |
| JP | 2021-093624 A | 6/2021 |
| JP | 2021170699 A | 10/2021 |

OTHER PUBLICATIONS

The above patent documents was cited in a European Search Report issued on Apr. 19, 2024, of which is enclosed, that issued in the corresponding European Patent Application No. 23206615.9.

*Primary Examiner* — Joel W Fosselman
(74) *Attorney, Agent, or Firm* — Cowan, Liebowitz & Latman, P.C.

(57) ABSTRACT

An electronic apparatus includes a proximity detector configured to detect proximity of an object to a viewfinder, a line-of-sight detector configured to detect line-of-sight information for a first display unit disposed inside the viewfinder, a memory storing instructions, and a processor configured to execute the instructions to determine an eye proximity state or an eye absence state based on a detection result of the line-of-sight detector, and start driving the proximity detector in a case where the processor determines the eye absence state, and stop driving the line-of-sight detector in a case where the proximity detector does not detect the proximity of the object.

11 Claims, 7 Drawing Sheets

ELECTRONIC APPARATUS, ITS CONTROL METHOD, AND STORAGE MEDIUM

BACKGROUND

Technical Field

One of the aspects of the embodiments relates to an electronic apparatus, its control method, and a storage medium.

Description of Related Art

Some conventional electronic apparatuses include an eye proximity sensor (proximity or approach detector) configured to detect eye proximity or approach and a line-of-sight (or visual line) detecting sensor (line-of-sight detector) configured to detect a user's line of sight. This type of electronic apparatus may cause erroneous detection due to mutual influence of the lights emitted from respective sensors (sensor lights). Japanese Patent Laid-Open No. 2021-093624 discloses an electronic apparatus that drives the line-of-sight detector and stops the eye proximity detector in a case where an eye proximity detector detects eye proximity, and stops the line-of-sight detector and drives the eye proximity detector in a case where the line-of-sight detector cannot detect the line of sight. Thus controlling the eye proximity detector and line-of-sight detector can prevent the respective sensor lights from influencing each other.

The electronic apparatus disclosed in Japanese Patent Laid-Open No. 2021-093624 cannot detect the line of sight if the eye slightly shifts to the side of the viewfinder in determining the separation of the user's eye (eye separation, eye absence, or eye non-proximity), thus determines the eye separation, stops the line-of-sight detector, and drives the eye proximity detector. In addition, this electronic apparatus cannot detect the line of sight in a case where the user blinks, and thus this electronic apparatus repeatedly stops the line-of-sight detector and drives the eye proximity detector whenever the user blinks. As a result, this electronic apparatus cannot stably detect the line of sight.

SUMMARY

An electronic apparatus according to one aspect of the embodiment includes a proximity detector configured to detect proximity of an object to a viewfinder, a line-of-sight detector configured to detect line-of-sight information for a first display unit disposed inside the viewfinder, a memory storing instructions, and a processor configured to execute the instructions to determine an eye proximity state or an eye absence state based on a detection result of the line-of-sight detector, and start driving the proximity detector in a case where the processor determines the eye absence state, and stop driving the line-of-sight detector in a case where the proximity detector does not detect the proximity of the object. A control method of the above electronic apparatus also constitutes another aspect of the embodiment.

Further features of the disclosure will become apparent from the following description of embodiments with reference to the attached drawings.

DESCRIPTION OF THE EMBODIMENTS

Figure 1A:
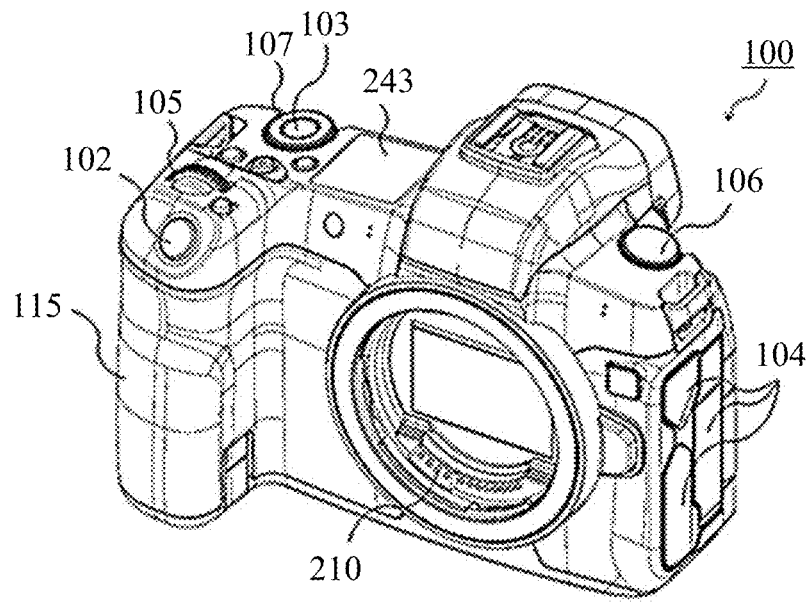
FIGS. 1A and 1B are external views of an image pickup apparatus according to a first embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. A plurality of features are described in each embodiment but not all of these features are essential, and the plurality of features may be arbitrarily combined. In each figure, the same element will be designated by the same reference numeral, and a duplicate description will be omitted.

First Embodiment

Figure 1B:
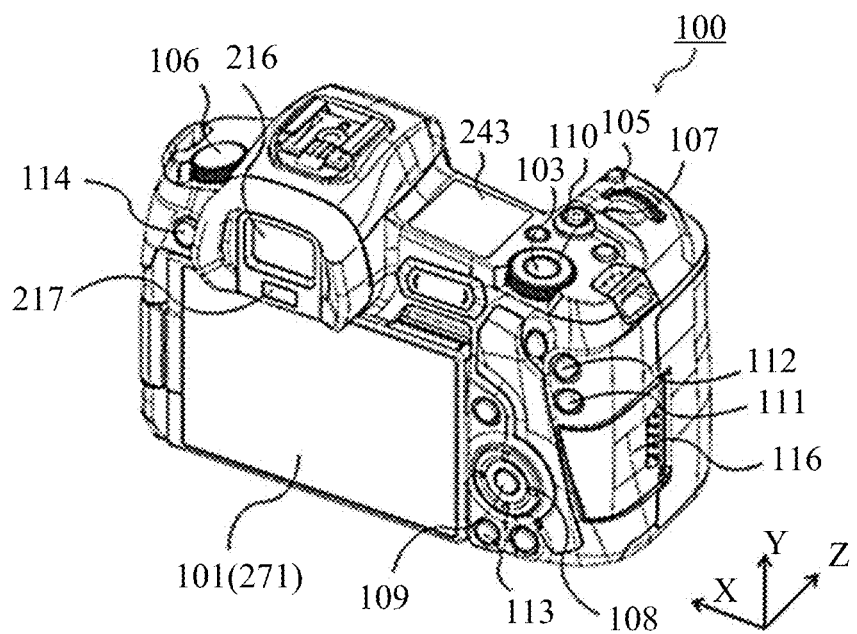

Referring now to FIGS. 1A and 1B, a description will be given of the configuration and function of an image pickup apparatus (digital camera, camera body) 100 as an electronic apparatus according to a first embodiment. FIGS. 1A and 1B are external views of the image pickup apparatus 100. FIG. 1A illustrates a front perspective view of the image pickup apparatus 100. FIG. 1B illustrates a rear perspective view of the image pickup apparatus 100. The image pickup apparatus 100 is a digital camera that can capture still or moving images.

A rear display unit 101 is a display device such as a liquid crystal panel or an organic EL panel provided on the rear surface of the image pickup apparatus 100 outside the viewfinder and displays images and various information so that the user can recognize them. The rear display unit 101 has a function of playing back still images that have been captured, displaying moving images during recording, and displaying live-view images. A touch panel 271 is provided on the rear display unit 101. The touch panel 271 is a touch detector configured to detect contact (touch operation) on the display surface of the rear display unit 101 (operation surface of the touch panel 271). An extra-finder display unit 243 is a display device such as a liquid crystal panel or an organic EL panel provided on the top surface of the camera body, and displays various camera settings such as a shutter speed and an F-number (aperture value).

A shutter button (SHUTTER BTN) 102 is a push-button operation member for instructing imaging. A mode switch 103 is a dial type operating member for switching between various modes. The mode switch 103 switches the operation mode of a system control unit 201 to one of a still image capturing mode, a moving image recording mode, and a playback mode. The still image capturing mode includes, for example, an auto imaging mode, an auto scene determining mode, a manual mode, an aperture priority mode (Av mode), a shutter speed priority mode (Tv mode), a program auto-exposure (AE) mode (P mode), various scene modes, a program AE mode, a custom mode, etc., which are imaging settings for each imaging scene. The mode switch 103 is used to directly switch to one of the plurality of modes included in the still image capturing mode. Alternatively, after the mode switch 103 once switches to the still image capturing mode, the mode may be switched to any one of a plurality of modes included in the still image capturing mode using another operating member. Similarly, the moving image recording mode and playback mode may also include a plurality of modes.

A terminal cover 104 is a cover member that protects a connector (not illustrated) for connecting an external device and the image pickup apparatus 100 via a cable such as a USB cable. A main electronic dial 105 is a rotary operation member included in an operation (OPE) unit 270 that will be described below with reference to FIG. 2, and turning the main electronic dial 105 can change a set value such as shutter speed and an F-number. A power switch 106 is an operation member that turns on and off the power of the image pickup apparatus 100. A sub electronic dial 107 is a rotary operation member that moves a selection frame, feeds images, and the like. A cross key 108 is a movement instruction member operable in accordance with the pressed part of the cross key 108 by pressing any one of four direction buttons consisting of up, down, left, and right.

A SET button 109 is a push-button operation member that is mainly used to determine a selection item. A recording button 110 is a push-button operation member that is used to switch on and off of live-view display in the still image capturing mode, and to instruct to start or stop moving image capturing (recording) in the moving image recording mode. An enlargement button 111 is a push-button operation member that is used to turn on and off enlarged display during live-view and change the enlargement ratio during enlarged display. The enlargement button 111 is also used to enlarge the playback image and increase the enlargement ratio in the playback mode. The live-view image can be enlarged or reduced by operating the main electronic dial 105 after the enlarged display is turned on.

An AE lock button 112 is a push-button operation member that can fix the exposure state when pressed in the imaging standby state. A playback button 113 is a push-button operation member that is used to switch between the imaging mode and the playback mode. By pressing the playback button 113 during the imaging mode, the mode shifts to the playback mode, and the latest image among the images recorded on a recording medium 250 can be displayed on the rear display unit 101. A menu button 114 is a push-button operation member that displays a menu screen with various settings on the rear display unit 101 when pressed. The user can intuitively make various settings using the menu screen displayed on the rear display unit 101, the cross key 108, and the SET button 109.

The rear display unit (second display unit) 101 and a viewfinder display unit (first display unit located inside the viewfinder) 229, which will be described below, function as an electronic viewfinder (EVF) and their displays are controlled by the system control unit 201 according to the various operation modes described above. An eyepiece unit 216 is a peering type eyepiece viewfinder. The user can visually recognize the image displayed on the intra-finder display unit 229 via the eyepiece unit 216, and can confirm the focus and composition of an object image captured through a lens apparatus 200. An eye proximity detector (EYE PRX) 217 is disposed near the eyepiece unit 216 and can detect the proximity of an object to the eyepiece unit 216 (the proximity of an object to the viewfinder). The eye proximity detector 217 uses, for example, an infrared proximity sensor.

Figure 2:
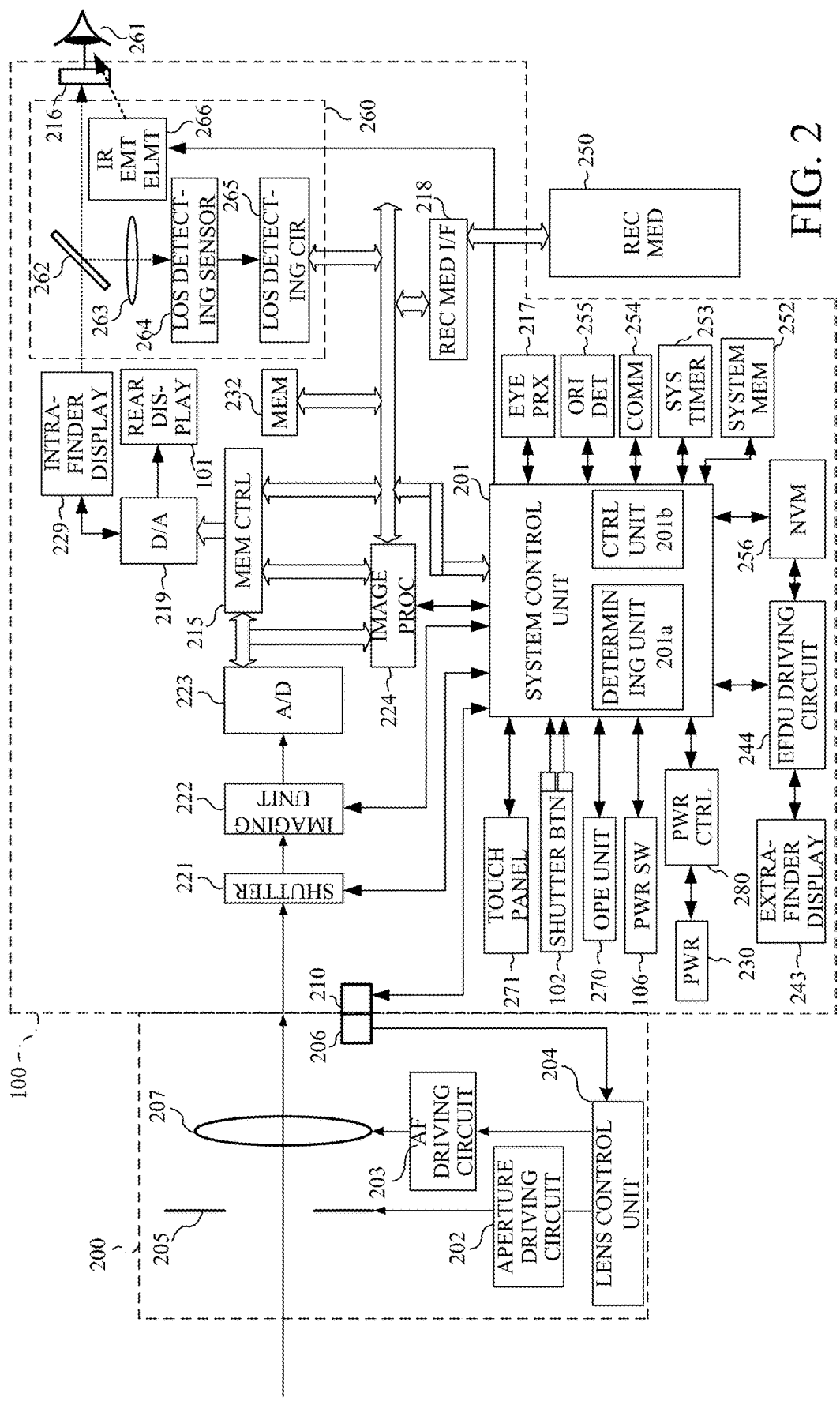
FIG. 2 is a block diagram of an imaging system according to the first embodiment.

A communication terminal 210 is an electrical contact point through which the image pickup apparatus 100 communicates with the lens apparatus 200 (see FIG. 2). A lid 116 is a member that opens and closes a slot in order to attach and detach the recording medium 250 to and from the image pickup apparatus 100. A grip portion 115 is shaped so that the user can easily grip it with his right hand in a case where the user holds the image pickup apparatus 100. The shutter button 102 and the main electronic dial 105 are disposed at positions operable with the user's index finger of his right hand while the user holds the image pickup apparatus 100 by gripping the grip portion 115 with the little finger, ring finger, and middle finger of his right hand. In the same state, the sub electronic dial 107 is disposed at a position that can be operated with the thumb of the right hand.

Referring now to FIG. 2, a description will be given of the internal configuration of the imaging system 10 according to this embodiment. FIG. 2 is a block diagram of the imaging system 10. The imaging system 10 includes the image pickup apparatus (camera body) 100 and the lens apparatus (interchangeable lens) 200 that is attachable to and detachable from the image pickup apparatus 100. However, this embodiment is not limited to this example, and can also be applied to an image pickup apparatus in which the camera body and the lens apparatus are integrated with each other. In FIG. 2, components common to those of FIGS. 1A and 1B will be designated by the same reference numerals.

The lens apparatus 200 includes an imaging optical system 207. Although the imaging optical system 207 normally includes a plurality of lenses, only a single lens is illustrated here for simplicity. A communication terminal 206 is an electrical contact point through which the lens apparatus 200 communicates with the image pickup apparatus 100. The communication terminal 210 is an electrical contact point through which the image pickup apparatus 100 communicates with the lens apparatus 200. The lens apparatus 200 communicates with the system control unit 201 via the communication terminal 206, and a built-in lens control unit 204 controls an aperture driving circuit 202 to drive the aperture stop 205, and controls an AF driving circuit 203 to change a position of the imaging optical system 207 for focusing.

A focal plane shutter 221 can freely control the exposure time of an imaging unit 222 according to an instruction from the system control unit 201. The imaging unit 222 includes an image sensor (image pickup element or photoelectric conversion element) such as a CCD or CMOS that converts an object image into an electrical signal. An A/D converter 223 converts the one-pixel analog signal output from the imaging unit 222 into, for example, a 10-bit digital signal. An image processing unit 224 performs predetermined resizing processing such as pixel interpolation and reduction, and color conversion processing for the data from the A/D converter 223 or the data from a memory control unit 215. The image processing unit 224 performs predetermined calculation processing using the captured image data, and the system control unit 201 performs exposure control and distance measurement control based on the calculation results. Thereby, through-the-lens (TTL) type autofocus (AF) processing, AE processing, and flash pre-emission (EF) processing are performed. The image processing unit 224 also performs predetermined calculation processing using the captured image data, and performs TTL type auto white balance (AWB) processing based on the calculation result.

The memory control unit 215 controls data exchange with the A/D converter 223, the image processing unit 224, or a memory 232. Digital data output from the A/D converter 223 is directly written into the memory 232 via the image processing unit 224 and the memory control unit 215 or via the memory control unit 215. The memory 232 stores image data obtained from the imaging unit 222 and the A/D converter 223 and image display data to be displayed on the rear display unit 101 or intra-finder display unit 229. The memory 232 has a storage capacity sufficient to store a predetermined number of still images, a predetermined period of moving images, and audio. The memory 232 also serves as an image display memory (video memory). A D/A converter 219 converts the image display data stored in the memory 232 into an analog signal and supplies it to the rear display unit 101 or the intra-finder display unit 229.

The image data for display written in the memory 232 is displayed on the rear display unit 101 and the intra-finder display unit 229 via the D/A converter 219. The rear display unit 101 and the intra-finder display unit 229 perform display on the display device according to the analog signal from the D/A converter 219. Thus, by converting the digital signal stored in the memory 232 into an analog signal and sequentially transferring and displaying it on the rear display unit 101 or the intra-finder display unit 229, the EVF that provides live-view (LV) display (through image display) can be achieved. Various setting values of the camera, such as shutter speed and aperture stop, are displayed on the extra-finder display unit 243 via an extra-finder display unit (EFDU) driving circuit 244.

A nonvolatile memory (NVM) 256 is electrically erasable and recordable, such as an EEPROM. The nonvolatile memory 256 stores constants, programs, etc. for the operation of the system control unit 201. Here, the program is a program for executing a flowchart described below. The system control unit 201 includes a CPU and an MPU that collectively control the entire image pickup apparatus 100, and executes programs stored in the nonvolatile memory 256 to realize each processing in the flowchart described below. The system memory 252 is a RAM or the like, and is also used as a work memory for storing constants and variables for the operation of the system control unit 201, programs read from the nonvolatile memory 256, and the like. The system control unit 201 also performs display control by controlling the memory 232, the D/A converter 219, the rear display unit 101, the intra-finder display unit 229, and the like.

A system timer 253 is a timer that measures the time for various controls and the time of the built-in clock. A first shutter switch 211 and a second shutter switch 212 input the following operation instructions to the system control unit 201. The first shutter switch 211 is turned on in a case where the shutter button 102 provided on the image pickup apparatus 100 is pressed halfway or half-pressed (imaging preparation instruction), and generates a first shutter switch signal SW1. The system control unit 201 receives the first shutter switch signal SW1 and causes the image processing unit 224 to start the AF processing, AE processing, AWB processing, EF processing, etc. The second shutter switch 212 is turned on in a case where the operation of the shutter button 102 is completed or fully pressed (imaging instruction), and generates a second shutter switch signal SW2. The system control unit 201 starts a series of imaging processing from reading out signals from the imaging unit 222 to writing image data to the recording medium 250 in response to the second shutter switch signal SW2.

The operation unit 270 is an operation member such as various switches or buttons that receives various operations from the user and notifies the system control unit 201 of the instruction. The operation members include, for example, the shutter button 102, the mode switch 103, the main electronic dial 105, the power switch 106, the sub electronic dial 107, and the cross key 108. An imaging member includes the SET button 109, the recording button 110, the enlargement button 111, the AE lock button 112, the playback button 113, and the menu button 114. A power supply control unit 280 includes a battery detection circuit, a DC-DC converter, a switch circuit for switching the block to be electrified, and the like, and detects whether or not a battery is attached, the type of battery, and the remaining battery level. The power supply control unit 280 controls the DC-DC converter based on the detection result and instruction from the system control unit 201, and supplies necessary voltage to each unit including the recording medium 250 for a necessary period. The power supply unit 230 includes a primary battery such as an alkaline battery or a lithium battery, a secondary battery such as a NiCd battery, a NiMH battery, or a Li-ion battery, an AC adapter, or the like. The recording medium I/F 218 is an interface with a recording medium 250 such as a memory card or a hard disk drive.

The recording medium 250 is a recording medium such as a memory card for recording captured images, and includes a semiconductor memory, a magnetic disk, or the like. The communication unit 254 is communicably connected to external device via a wireless antenna or wired cable, and transmits and receives video and audio. The communication unit 254 can also be connected to a wireless Local Area Network (LAN) and the Internet. The communication unit 254 can transmit image data (including live-view images) captured by the imaging unit 222 and image files recorded on the recording medium 250 to the external device, and can also transmit image data and other various types from the external device. The communication unit 254 is not limited to wireless LAN, and may use a wireless communication module such as infrared communication, Bluetooth (registered trademark), Bluetooth (registered trademark) Low Energy, Wireless USB, or the like. Alternatively, the communication unit 254 may use a wired connection unit such as a USB cable, HDMI (registered trademark), or IEEE1394.

An orientation detector (ORI DET) 255 detects the orientation of the image pickup apparatus 100 relative to the gravity direction. Based on the orientation detected by the orientation detector 255, it can be determined whether the image taken by the imaging unit 222 is an image taken with the image pickup apparatus 100 held horizontally or an image taken with the image pickup apparatus 100 held vertically. The system control unit 201 can add orientation information according to the orientation detected by the orientation detector 255 to the image file of the image captured by the imaging unit 222, or can rotate and record the image. The orientation detector 255 includes, for example, an acceleration sensor or a gyro sensor. The orientation detector 255 can also detect movement (panning, tilting, lifting, standing still, etc.) of the image pickup apparatus 100 using the acceleration sensor or the gyro sensor.

The image pickup apparatus 100 includes the touch panel 271 as the operation unit 270 that can detect a touch operation on the rear display unit 101. The touch panel 271 and the rear display unit 101 can be integrated. For example, the touch panel 271 is configured such that its light transmittance does not interfere with the display on the rear display unit 101, and is attached to the upper layer of the display surface of the rear display unit 101. The input coordinates on the touch panel 271 are associated with the display coordinates on the rear display unit 101. Thereby, a GUI can be configured as if the user could directly operate the screen displayed on the rear display unit 101.

The system control unit 201 can detect the following operations or states on the touch panel 271.

(1) The user's finger or pen, which has not touched the touch panel 271, newly touched the touch panel 271. That is, the start of a touch (referred to as touch-down hereinafter).
(2) The touch panel 271 is being touched with the user's finger or pen (referred to as touch-on hereinafter).
(3) The user's finger or pen is moving while touching the touch panel 271 (referred to as touch-move hereinafter).
(4) The finger or pen that has touched the touch panel 271 is released. That is, the end of the touch (referred to as touch-up hereinafter).
(5) Nothing touches the touch panel 271 (referred to as touch-off hereinafter).

In a case where the touch-down is detected, the touch-on is also detected at the same time. After the touch-down, the touch-on typically continues to be detected unless the touch-up is detected. The touch-move is also detected while the touch-on is detected. Even if the touch-on is detected, if the touch position does not move, the touch-move is not detected. After all touching fingers and pens are detected to have touched up, the touch-off is detected. These operations and states and the position coordinates where the finger or pen is touching on the touch panel 271 are notified to the system control unit 201 through the internal bus. The system control unit 201 then determines what kind of operation (touch operation) has been performed on the touch panel 271 based on the notified information.

Regarding the touch-move, the moving direction of the user's finger or pen on the touch panel 271 can also be determined for each vertical component and horizontal component on the touch panel 271 based on changes in position coordinates. In a case where the touch-move over a predetermined distance is detected, it is determined that a sliding operation (drag) has been performed. An operation in which the user quickly moves his fingers by a certain distance while the user's finger touches the touch panel, and then releases his finger will be called a flick. In other words, the flick is an operation in which a finger is quickly traced on the touch panel 271 as if it flicks it. In a case where the touch-move over a predetermined distance and at a predetermined speed or higher is detected, and the touch-up is detected as is, it can be determined that the flick has been performed (it can be determined that the flick has occurred following the drag). A touch operation in which a plurality of points (for example, two points) are touched at the same time and the touch positions are brought closer to each other will be called pinch-in, and a touch operation in which the touch positions are moved away from each other will be called pinch-out. The pinch-out and the pinch-in will be collectively referred to as a pinch operation (or simply pinch).

The touch panel 271 may be any one of various types of touch panels, such as a resistive film type, a capacitive type, a surface acoustic wave type, an infrared type, an electromagnetic induction type, an image recognition type, and an optical sensor type. Depending on the type, a method that detects a touch using contact with the touch panel, or a method that detects a touch using the proximity of the user's finger or pen to the touch panel, but either method may be used.

The eye proximity detector 217 detects an approach of an object (eye) (eye proximity) and a separation of the eye (object) (eye absence, separation, distance, or non-proximity) to the eyepiece unit 216 (proximity detection). The system control unit 201 switches the rear display unit 101 and the intra-finder display unit 229 between the display (display state) and the non-display (non-display state) according to the state detected by the eye proximity detector 217. The system control unit 201 sets the display destination to the rear display unit 101 and hides (does not display) the intra-finder display unit 229 during the eye absence at least in the imaging mode and in a case where the display destination switching is automatic.

A specific implementation method is as follows: In a case where an object approaches, infrared light emitted from a light emitter (not illustrated) of the eye proximity detector 217 is reflected and the reflected light enters the light receiver (not illustrated) of the infrared proximity sensor. Thereby, the approach of the object to the eyepiece unit 216 can be detected, and the distance of the object from the eyepiece unit 216 (eye proximity distance) can be determined based on the incident infrared light amount received by the infrared proximity sensor. In a case where the approach of the object to the eyepiece unit 216 is detected, the object approach information to the eyepiece unit 216 is transmitted to the system control unit 201, and the system control unit 201 starts displaying the intra-finder display unit 229. Thereby, in a case where the user peers through the eyepiece unit 216, the intra-intra-finder display unit 229 can be displayed as quickly as possible.

In a case where the object whose proximity was detected moves away from the eye proximity state (approach state) determined by the system control unit 201 by a predetermined distance or longer, the separation information on the object from the eyepiece unit 216 is transmitted to the control unit 201. Then, the system control unit 201 stops the display on the intra-finder display unit 229 and starts the display on the rear display unit 101. A threshold for detecting eye proximity and a threshold for detecting eye separation may be different by providing hysteresis, for example. After the eye proximity is detected, assume that the eye proximity state is kept until the eye absence is detected. After the eye absence is detected, assume that the eye absence state is kept until the eye proximity state is detected. Thereby, the system control unit 201 controls the display on the rear display unit 101 and the display on the intra-finder display unit 229 according to the eye proximity state or the eye absence state detected by the eye proximity detector 217. The eye proximity detector 217 is not limited to an infrared proximity sensor, and another sensor may be used as long as it can detect the approach of an eye or an object that can be considered as proximity.

The image pickup apparatus 100 according to this embodiment includes a line-of-sight detecting apparatus (line-of-sight detector) 260 configured to detect information about the user's line of sight (line-of-sight position relative to the intra-finder display unit 229) in a case where the user is peering through the eyepiece unit 216. The line-of-sight detector 260 includes a dichroic mirror 262, an imaging lens 263, a line-of-sight (LOS) detecting sensor 264, a line-of-sight detecting circuit 265, and an infrared light emitting element (IR EMT ELMT) 266, and detects not only the presence or absence of the user's line of sight but also the position and movement of the line of sight.

The infrared light emitting element 266 is a diode that emits infrared light to detect the user's line of sight position within the viewfinder screen and emits infrared light to the user's eyeball (eye) 261 near the center of the eyepiece unit 216. The infrared light emitted from the infrared light emitting element 266 is reflected by the eyeball (eye) 261, and the reflected infrared light reaches the dichroic mirror 262. The dichroic mirror 262 has a function of reflecting only infrared light and transmitting visible light, and the reflected infrared light whose optical path has been changed is imaged on an imaging surface of the line-of-sight detecting sensor 264 via the imaging lens 263. The imaging lens 263 is an optical element that constitutes a line-of-sight detecting optical system.

The line-of-sight detecting sensor 264 includes an image sensor such as a CCD or CMOS. The line-of-sight detecting sensor 264 photoelectrically converts incident reflected infrared light into an electrical signal and outputs it to the line-of-sight detecting circuit 265. The line-of-sight detecting circuit 265 detects the user's line-of-sight position from the movement of the user's eyeball (eye) 261 and the pupil position based on the output signal of the line-of-sight detecting sensor 264, and sends the detected information (detection result) to the system control unit 201. The line-of-sight detecting sensor 264 can detect the pupil of a person's eye, and thus does not detect that a person's line of sight is being input even if another object approaches or contacts the eyepiece unit 216. Thereby, the eyepiece unit 216 has a function as a line-of-sight operation unit, but the line-of-sight detector may have a different configuration.

The line-of-sight detector 260 can detect the following information in the eye proximity state to the eyepiece unit 216.
(1) Detection state of at least one of a pupil edge 161*a* and corneal reflection images (Purkinje images=P images) 161*b* input to the eyepiece unit 216
(2) Distance, change amount, and changing direction between P images 161*b* input to the eyepiece unit 216

These pieces of information are notified to the system control unit 201 through the internal bus, and the system control unit 201 determines the eye proximity state or eye absence state for the eyepiece unit 216 based on the information notified from the line-of-sight detector 260. As described above, since eyeball information is measured using light (for example, infrared light) from the light emitter, line-of-sight information (line-of-sight position) may not be able to be correctly detected if there is light from another light source. Hence, it is necessary to stop the light emission of the eye proximity detector 217. The user can set the enablement and disablement of the line-of-sight input function by the line-of-sight detector 260, for example, via a menu screen.

In this embodiment, the system control unit 201 includes a determining unit 201*a* and a control unit 201*b*. The determining unit 201*a* determines the eye proximity state or the eye absence state (eye separation state) based on the detection result of the line-of-sight detector 260. The control unit 201*b* performs control so that the eye proximity detector 217 is driven from the stopped state in a case where the determining unit 201*a* determines the eye absence state, and the line-of-sight detector 260 stops driving in a case where the eye proximity detector 217 does not detect the proximity of an object.

Figure 3A:
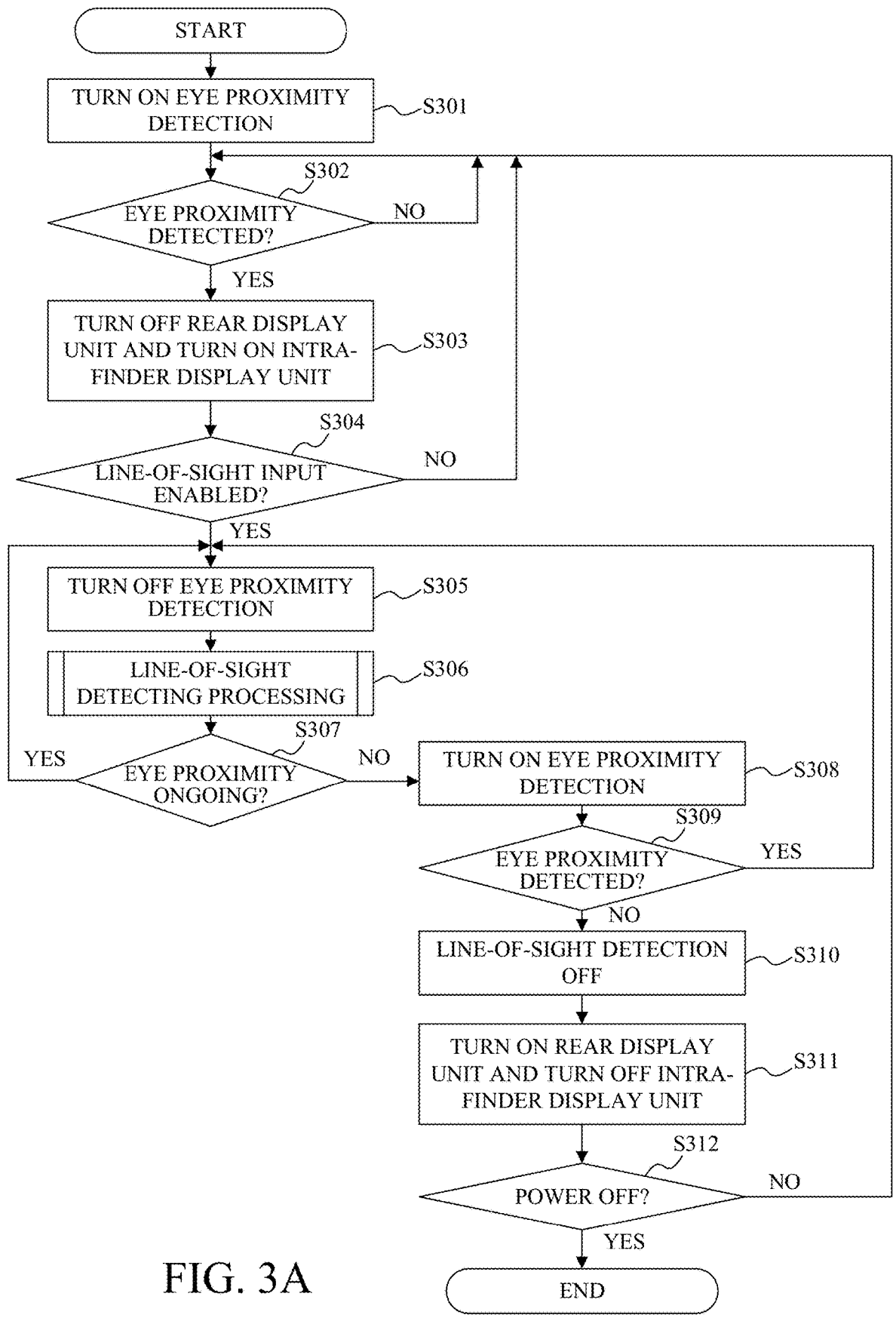
FIGS. 3A and 3B are flowcharts illustrating a control method according to the first embodiment.
Figure 3B:
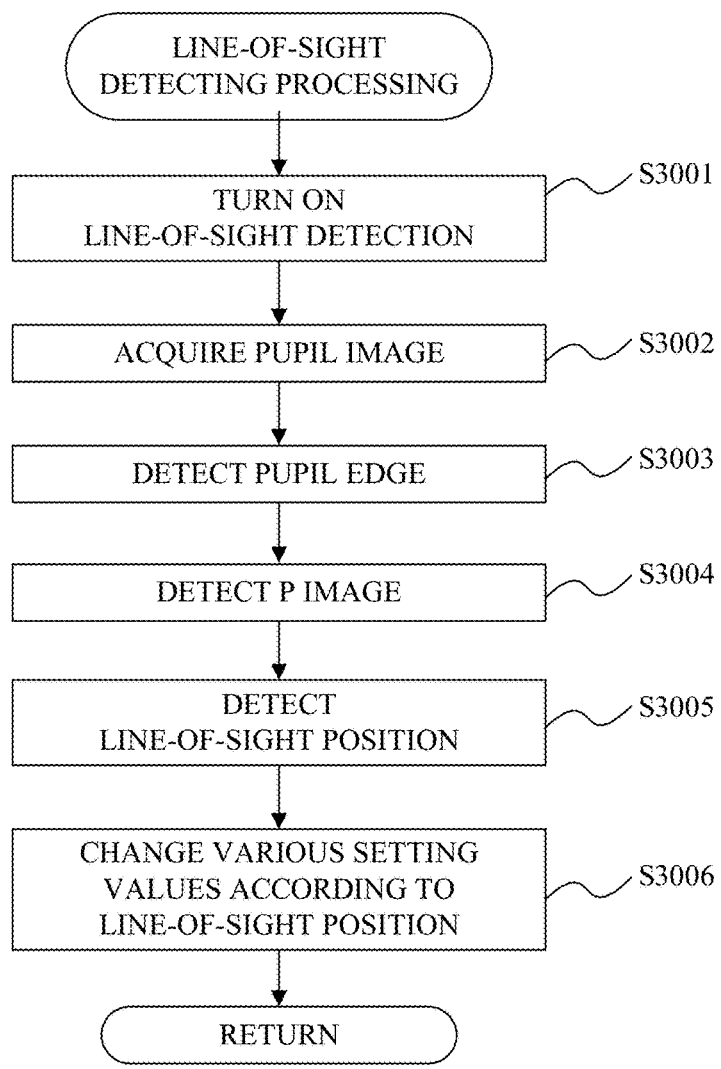
Figure 4:
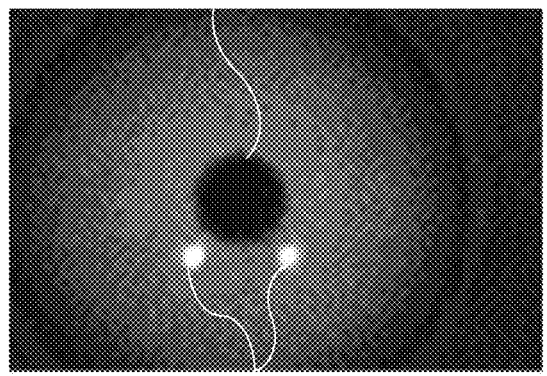
FIG. 4 is an eyeball image of a person projected with infrared light in the first embodiment.

Referring now to FIGS. 3A, 3B, and 4, a description will be given of a control method (exclusive control of eye proximity detecting processing and line-of-sight detecting processing) according to this embodiment. A description will now be given of exclusive control of the eye proximity detecting processing and the line-of-sight detecting processing in accordance with the eye absence determination based on the disappearance of the P images and the pupil edge. FIG. 3A is a flowchart illustrating the control method (exclusive control of eye proximity detecting processing and line-of-sight detecting processing) according to this embodiment. FIG. 3B is a flowchart illustrating step S306 (line-of-sight detecting processing) in FIG. 3A. Processing in FIGS. 3A and 3B is started when the image pickup apparatus 100 is powered on, and the system control unit 201 loads the program stored in the nonvolatile memory 256 into the system memory 252 and executes it to control each functional block.

First, in step S301 of FIG. 3A, the system control unit 201 switches the eye proximity detector 217 to a detectable state. The system control unit 201 causes the infrared light emitter of the eye proximity detector 217 to project infrared light to the outside, and the infrared light receiving sensor to receive the infrared light reflected from the object. Next, in step S302, the system control unit 201 determines whether the user is in the eye proximity state relative to the eyepiece unit 216 based on the detection result of the eye proximity detector 217. In a case where the system control unit 201 determines the eye absence state, the system control unit 201 repeats step S302. On the other hand, in a case where the system control unit 201 determines the eye proximity state, the flow proceeds to step S303.

In step S303, the system control unit 201 (control unit 201*b*) stops (hides) the display on the rear display unit 101 and starts the display on the intra-finder display unit 229. Next, in step S304, the system control unit 201 determines whether the line-of-sight input function is enabled. In a case where the line-of-sight input function is enabled, the flow proceeds to step S305. On the other hand, in a case where the line-of-sight input function is not enabled, the flow returns to step S302. The user can set the enablement and disablement of the line-of-sight input function using the menu button 114 (on the menu screen).

In step S305, the system control unit 201 sets the eye proximity detector 217 to a non-detection state and stops driving the infrared light emitter and infrared light receiving sensor of the eye proximity detector 217 (turns off the eye proximity detection). Next, in step S306, the system control unit 201 performs line-of-sight detecting processing. That is, in a case where the determining unit 201*a* determines the eye proximity state, the control unit 201*b* stops driving the eye proximity detector 217 and then drives the line-of-sight detector 260.

Referring now to FIG. 3B, a detailed description will be given of the line-of-sight detecting processing. First, in step S3001, the system control unit 201 sets the line-of-sight detector 260 to a detectable state. The system control unit 201 causes the infrared light emitting element 266 of the line-of-sight detector 260 to irradiate infrared light toward the eyepiece unit 216 and drives the line-of-sight detecting sensor 264 to enable it to detect infrared light. Thereby, the infrared light from the infrared light emitting element 266 reaches the user's eyeball via the eyepiece unit 216, and further reaches the line-of-sight detecting sensor 264 via the eyepiece unit 216.

Referring now to FIG. 4, a description will be given of the P images and the pupil edge. FIG. 4 is an eyeball image of a person onto which infrared light is projected. On the eyeball onto which the infrared light is projected, one or more (two in FIG. 4) bright spots called P images 161*b* appear as reflected images. The pupil is a hole at the center of the iris, and the pupil edge 161*a* can be detected from the luminance difference.

In step S3002 in FIG. 3B, the system control unit 201 acquires an image of the user (pupil image) using the line-of-sight detecting sensor 264, and outputs the acquired image to the line-of-sight detecting circuit 265. Next, in step S3003, the system control unit 201 acquires the user's pupil edge 161*a* through the line-of-sight detecting circuit 265. Next, in step S3004, the system control unit 201 acquires the user's P images 161*b* through the line-of-sight detecting circuit 265.

Next, in step S3005, the system control unit 201 calculates the center position of the pupil from the pupil edge 161*a*, and calculates (acquires) the line-of-sight position (line-of-sight information) from the relationship with the P images 161*b*. Next, in step S3006, the system control unit 201 performs various settings changes at the line-of-sight position. For example, the various settings changes are various settings changes in imaging conditions, such as changing a focus position so that the image pickup apparatus 100 is focused on the gaze point (line-of-sight position). In a case where the processing of step S3006 ends, the line-of-sight detecting processing is ended and the flow proceeds to step S307 in FIG. 3A.

In step S307, the system control unit 201 (determining unit 201*a*) determines whether the eye proximity detector 217 has detected at least one of the pupil edge 161*a* and the P images 161*b*. In a case where at least one of the pupil edge 161*a* and the P images 161*b* is detected, the system control unit 201 determines the eye proximity state (that the user is in the eye proximity), and the flow returns to step S305. This embodiment makes the determination based on whether or not the P images 161*b* are detected, but the determination is not limited to this example, and for example, the determination may be made based on the number of P images. Thereby, in performing the line-of-sight detection in the subsequent steps, the line-of-sight detector 260 becomes operable without being affected by the infrared light emitted from the infrared light emitter of the eye proximity detector 217, and the line-of-sight detector 260 can prevent erroneous detection in the line-of-sight detection. Stopping driving the infrared light emitter of the eye proximity detector 217 can achieve power saving.

On the other hand, if neither the pupil edge 161*a* nor the P images 161*b* is detected in step S307, the system control unit 201 determines the eye absence state (eye non-proximity state), and the flow proceeds to step S308. In step S308, the system control unit 201 again drives the infrared emitter and infrared light receiving sensor of the eye proximity detector 217 in order to switch the eye proximity detector 217 to a detectable state (turn on the eye proximity detection). Next, in step S309, the system control unit 201 determines whether the user is in the eye proximity state to the eyepiece unit 216 based on the detection result of the eye proximity detector 217. In a case where the system control unit 201 determines the eye absence state, the flow proceeds to step S310. On the other hand, in a case where the system control unit 201 determines the eye proximity state, the flow returns to step S305.

In step S310, the system control unit 201 sets the line-of-sight detector 260 to a non-detection state (turns off the line-of-sight detection). Therefore, the system control unit 201 stops driving the infrared light emitting element 266 and the line-of-sight detecting sensor 264. Thereby, the eye proximity detector 217 can detect the eye proximity state even if the line of sight cannot be detected due to blinking or sideways eye shifting. Therefore, the system control unit 201 can prevent erroneous determination of the user's eye absence state (eye separation state) and continue the line-of-sight detection.

Next, in step S311, the system control unit 201 starts the display on the rear display unit 101 and stops the display on the intra-finder display unit 229. Next, in step S312, the system control unit 201 determines whether the power switch 106 has been turned off by the user. In a case where the power switch 106 is continuously turned on, the flow returns to step S302, and the system control unit 201 continues the detection state of the eye proximity detector 217. On the other hand, in a case where the power switch 106 is turned off, this flow ends.

This embodiment can continue the line-of-sight detection even if the user blinks or his eye shifts sideways while preventing the light for detecting the eye proximity state or the eye absence state and the light for detecting the line-of-sight position from affecting mutual sensors. In this embodiment, the system control unit 201 as a determining unit determines the eye proximity state or the eye absence state (eye no-proximity state) based on the detection result of the line-of-sight detector 260 (for example, the presence or absence of the pupil edge 161*a* and the P images 161*b*). Thereby, the eye proximity or absence can be determined even if the eye proximity detector 217 is in a non-detection state, and thus the eye proximity detecting processing and the line-of-sight detecting processing can be exclusively controlled.

Even if the user thinks he is staring at one point, his eyes move slightly. Thus, the line-of-sight detection result also becomes unstable, and thus in general, smoothing processing is performed using past line-of-sight detection history to suppress the slight movement of the eye. At this time, if the line-of-sight detecting sensor stops whenever the user blinks or his eye shifts sideways, the line of sight cannot be detected at a stable cycle, the smoothing processing to suppress the slight movement of the eye becomes unstable, and it becomes difficult to suppress fine movements in line-of-sight detection. Accordingly, this embodiment entrusts the final determination to the eye proximity detector 217 in the eye absence state, and thereby continues the line-of-sight detection without stopping it even if the line of sight cannot be detected due to blinking or lateral eye shifting. Thereby, the line of sight can be detected at a stable period and fine movements in the line-of-sight detection can be stably suppressed.

Second Embodiment

Figure 5:
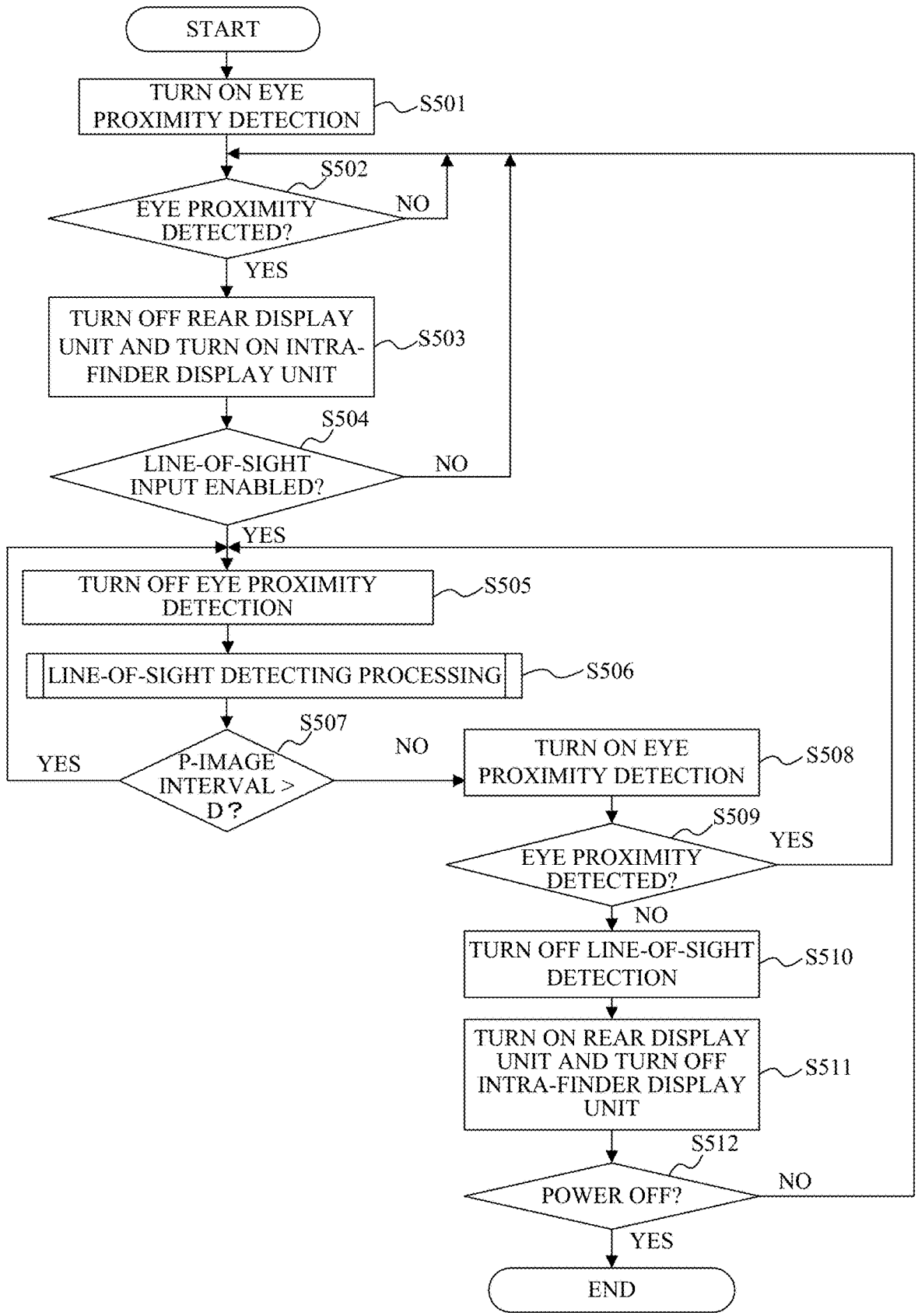
FIG. 5 is a flowchart illustrating a control method according to a second embodiment.

Referring now to FIG. 5, a description will be given of a second embodiment. This embodiment relates to a control method based on the interval between the P images in the exclusive control of the eye proximity detecting processing and the line-of-sight detecting processing. FIG. 5 is a flowchart illustrating the control method (exclusive control of the eye proximity detecting processing and the line-of-sight detecting processing) according to this embodiment. Steps S501 to S506 and S508 to S512 in FIG. 5 are the same as steps S301 to S306 and S308 to S312 in FIG. 3A, respectively, and a description thereof will be omitted.

In step S507, the system control unit 201 determines whether the interval between two points of the P images 161b acquired by the line-of-sight detecting sensor 264 (P-image interval) is larger than a threshold (P-image interval determination threshold) D. In a case where the P-image interval is larger than the threshold D, the system control unit 201 determines the eye proximity state, and the flow returns to step S505. On the other hand, in a case where the P image interval is equal to or less than the threshold D, the system control unit 201 determines the eye absence state, and the flow proceeds to step S508. The processing subsequent to step S508 are similar to that of the first embodiment, and a description thereof will be omitted.

Figure 6:
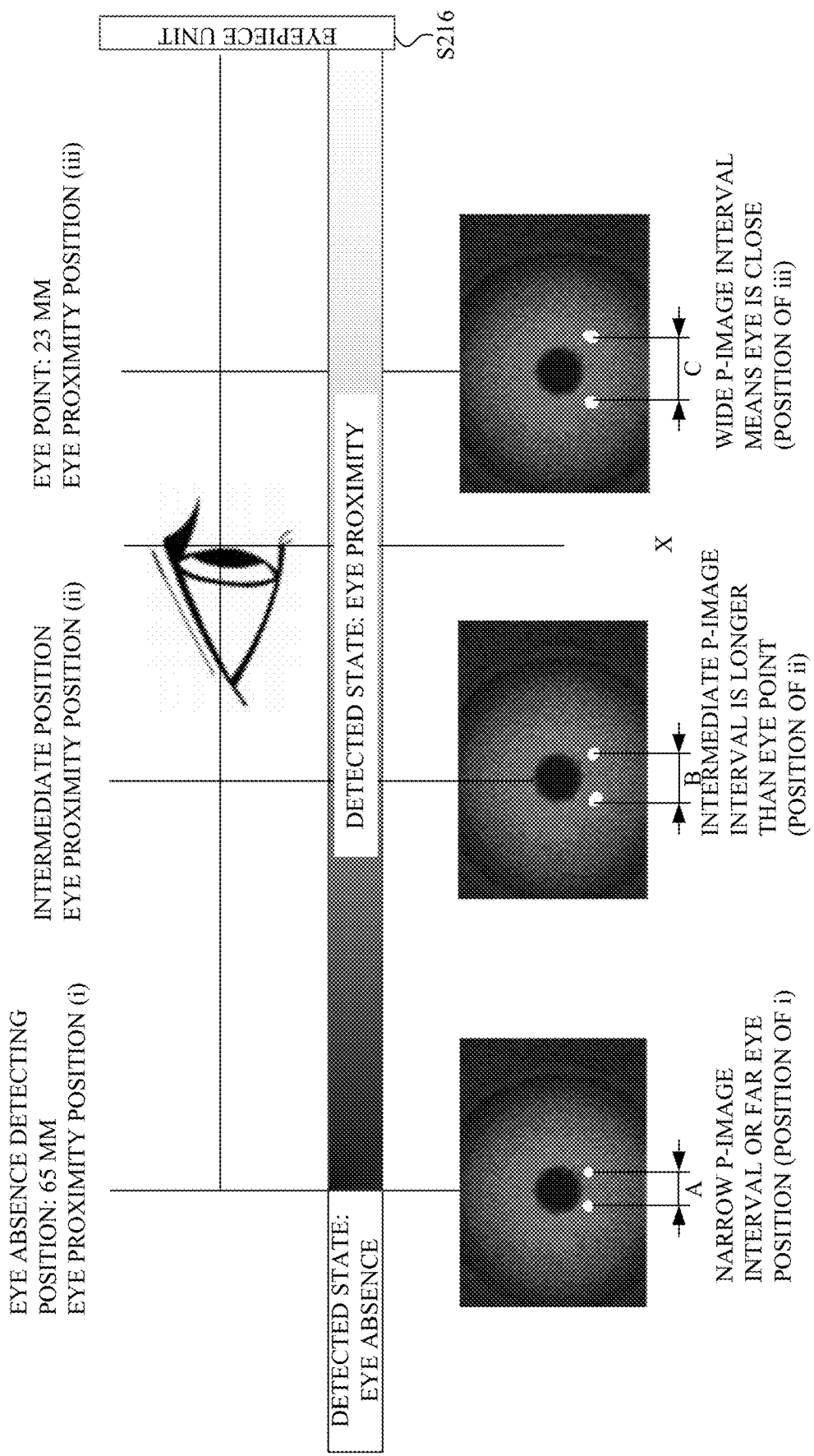
FIG. 6 illustrates a relationship between the eyeball image and the distance to the eyeball in the second embodiment.

Referring now to FIG. 6, a description will be given of the processing of step S507 (method for determining the eye absence state based on the P-image interval). FIG. 6 illustrates a relationship between an eyeball image and a distance to the eyeball (proximity distance from the eyeball to the image pickup apparatus 100) in this embodiment. The bottom of FIG. 6 illustrates changes in the interval between the P images 161b (P-image interval) acquired by the line-of-sight detecting sensor 264 relative to the position of the user's face while the eyepiece unit 216 is placed.

Eye proximity position (i) is a position 65 mm away from the eyepiece unit 216, and corresponds to the boundary where the eye proximity detector 217 determines the eye proximity state (position boundary condition). The interval between the P images 161b (P-image interval) at this position is as narrow as value A, for example. Eye proximity position (iii) is a position 23 mm away from the eyepiece unit 216, where the user maintains a part of his face in contact with the eyepiece unit 216. The P-image interval at this position is as wide as value C, for example. Assume that an intermediate position between the eye proximity position (i) and the eye proximity position (iii) is eye proximity position (ii), then value B of the P-image interval satisfies the following relationship:

$$A<B<C$$

This embodiment can continue the line-of-sight detection even if the user blinks or his eye shifts sideways while preventing the light for detecting the eye proximity state or the eye absence state and the light for detecting the line-of-sight position from affecting mutual sensors. This embodiment can prevent the influence of infrared light, and determine the eye proximity state or eye absence state based on the P-image interval. Thereby, the eye proximity or absence can be determined even if the eye proximity detector 217 is in a non-detection state, and thus the eye proximity detecting processing and the line-of-sight detecting processing can be exclusively controlled. Moreover, this embodiment entrusts the final determination to the eye proximity detector 217 in the eye absence state, and thereby continues the line-of-sight detection without stopping it even if the line of sight cannot be detected due to blinking or lateral eye shifting. Thereby, the line of sight can be detected at a stable period and fine movements in the line-of-sight detection can be stably suppressed.

Third Embodiment

Figure 7:
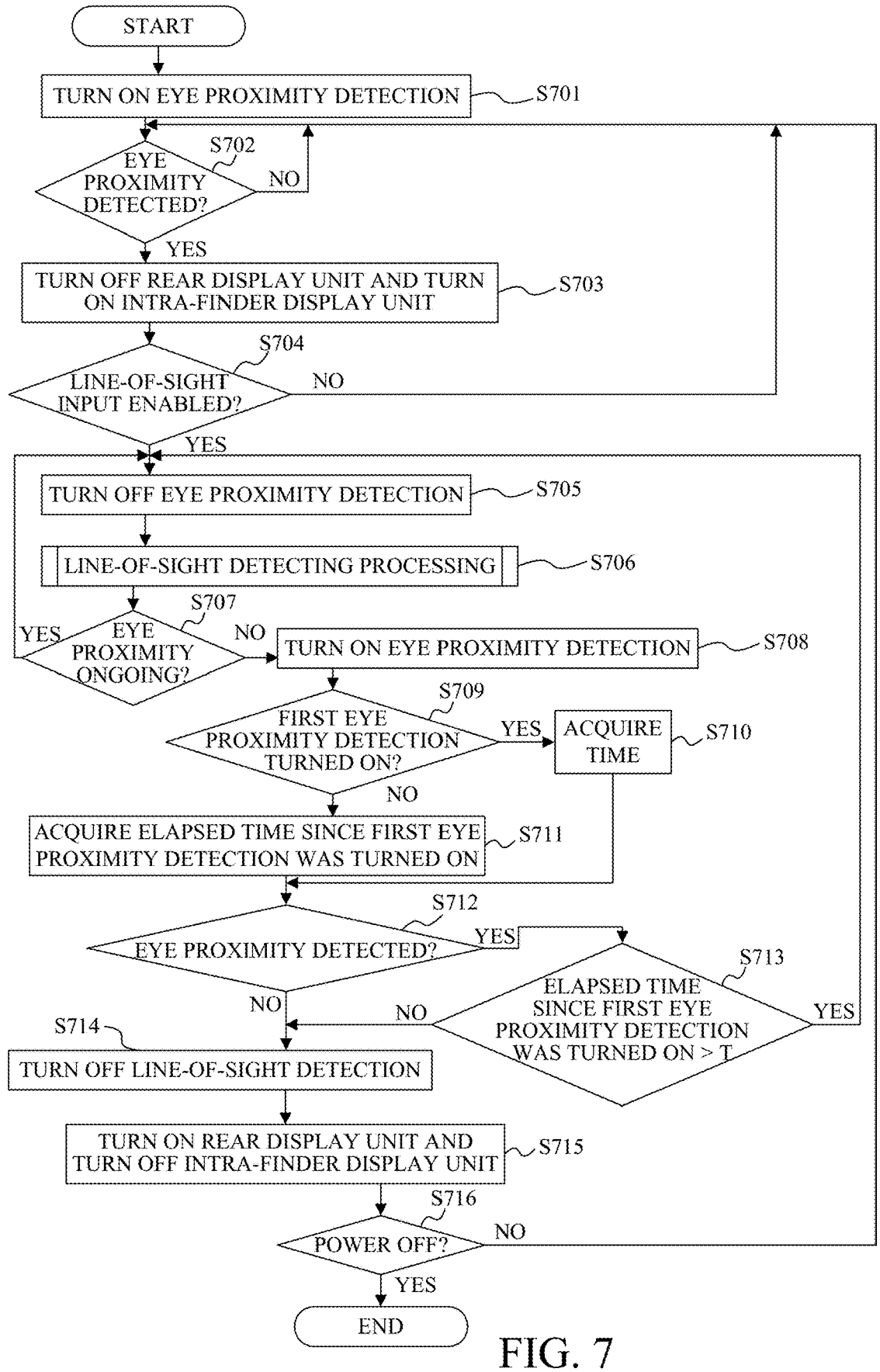
FIG. 7 is a flowchart illustrating a control method according to a third embodiment.

Referring now to FIG. 7, a description will be given of a third embodiment. This embodiment relates to a method of controlling whether to continue the line-of-sight detection based on the elapsed time since eye absence determination was made for the first time in the exclusive control of the eye proximity detecting processing and the line-of-sight detecting processing. FIG. 7 is a flowchart illustrating the control method (exclusive control of the eye proximity detecting processing and the line-of-sight detecting processing) according to this embodiment. Steps S701 to S708 and S714 to S716 in FIG. 7 are the same as steps S301 to S308 and S310 to S312 in FIG. 3A, respectively, and thus a description thereof will be omitted. In FIG. 7, step S507 in FIG. 5 may be inserted instead of step S707.

In step S709, after the eye absence determination is made in step S707, the system control unit 201 determines whether the infrared emitter and infrared light receiving sensor of the eye proximity detector 217 have been re-driven in step S708 for the first time (whether or not the eye proximity detection is turned on for the first time). In a case where this is the first re-driving, the flow proceeds to step S710, and the system control unit 201 acquires the re-driving time from the system timer 253. In a case where this is the second or subsequent re-driving, the flow proceeds to step S711.

In step S711, the system control unit 201 acquires the current time from the system timer 253, and calculates the elapsed time from the time acquired in step S710 (re-driving time) (elapsed time since the eye proximity detection was turned on for the first time). Next, in step S712, the system control unit 201 determines whether the user is in the eye proximity state to the eyepiece unit 216 based on the detection result of the eye proximity detector 217. In a case where the system control unit 201 determines the eye proximity state, the flow proceeds to step S713. On the other hand, in a case where the system control unit 201 determines the eye absence state, the flow proceeds to step S714.

In step S713, the system control unit 201 determines whether the elapsed time acquired in step S711 (elapsed time since the eye proximity detection was turned on for the first time) is greater than a threshold (elapsed-time determining threshold) T. In a case where the elapsed time is greater than the threshold T, the flow returns to step S705. On the other hand, in a case where the elapsed time is equal to or less than the threshold T, the flow proceeds to step S714.

In this embodiment, the control unit 201b stops driving the line-of-sight detector 260 when determining that the eye absence state continues for a predetermined period after the determining unit 201a determines the eye absence state. Therefore, in addition to the effects of the first or second embodiment, this embodiment can stop driving the line-of-sight detecting sensor 264 in a state where the line of sight cannot be continuously detected, and thereby providing energy saving.

Various above controls performed by the system control unit 201 may be performed by single hardware, or may be performed by multiple hardware through shared processing to control the entire apparatus.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can provide an electronic apparatus that can perform stable line-of-sight detection while preventing the sensor lights of the eye proximity detector and the line-of-sight detector from influencing each other.

This application claims the benefit of Japanese Patent Application No. 2022-192659, filed on Dec. 1, 2022, which is hereby incorporated by reference herein in its entirety.

What is claimed is:

1. An electronic apparatus comprising:
a proximity detector configured to detect proximity of an eye to a viewfinder;
a line-of-sight detector configured to detect line-of-sight information for a first display unit disposed inside the viewfinder;
a memory storing instructions; and
a processor configured to execute the instructions to:
determine an eye proximity state or an eye absence state based on a detection result of the line-of-sight detector,
drive the proximity detector from a stopped state in accordance with determination of the eye absence state based on the detection result of the line-of-sight detector,
continue to detect line-of-sight information by the line-of-sight detector after driving the proximity detector, and
stop driving the line-of-sight detector in accordance with the proximity detector not detecting eye proximity state.

2. The electronic apparatus according to claim 1, wherein the processor is configured to start driving the proximity detector in a case where the processor determines that the eye proximity state has changed to the eye absence state.

3. The electronic apparatus according to claim 1, wherein the detection result of the line-of-sight detector includes information about an edge of a pupil.

4. The electronic apparatus according to claim 1, wherein the detection result of the line-of-sight detector includes information about the number of corneal reflection images.

5. The electronic apparatus according to claim 1, wherein the detection result of the line-of-sight detector includes information about an interval between corneal reflection images.

6. The electronic apparatus according to claim 1, wherein the processor is configured to stop driving the line-of-sight detector in a case where the processor determines that the eye absence state continues for a predetermined period after determining the eye absence state.

7. The electronic apparatus according to claim 1, wherein the processor is configured to stop driving the proximity detector and then drive the line-of-sight detector in a case where the processor determines the eye proximity state.

8. The electronic apparatus according to claim 1, wherein the processor is configured to:
start display on the first display unit and stop display on a second display unit disposed outside the viewfinder in a case where the proximity detector detects the proximity of the object, and
stop the display on the first display unit and start the display on the second display unit in a case where the proximity detector does not detect the proximity of the object.

9. The electronic apparatus according to claim 1, wherein the electronic apparatus is an image pickup apparatus.

10. A method for controlling an electronic apparatus that includes a proximity detector configured to detect proximity of an object to a viewfinder, and a line-of-sight detector configured to detect line-of-sight information for a first display unit disposed inside the viewfinder, the method comprising the steps of:
determining an eye proximity state or an eye absence state based on a detection result of the line-of-sight detector;
drive the proximity detector from a stopped state in accordance with determination of the eye absence state based on the detection result of the line-of-sight detector,
continue to detect line-of-sight information by the line-of-sight detector after driving the proximity detector, and
stop driving the line-of-sight detector in accordance with the proximity detector not detecting eye proximity state.

11. A non-transitory computer-readable storage medium storing a program for causing a computer to execute the method according to claim 10.

* * * * *